P. D. GRAHAM.
Combined Cutting and Clinching Tool.
No. 227,243.  Patented May 4, 1880.
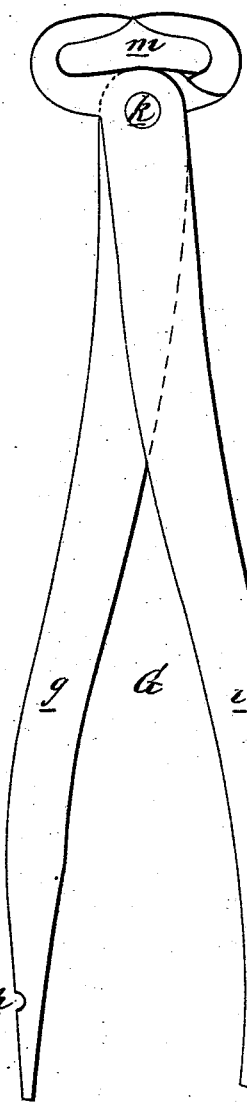
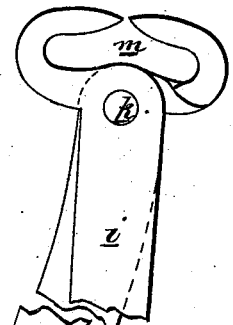
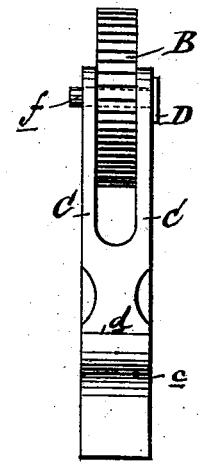
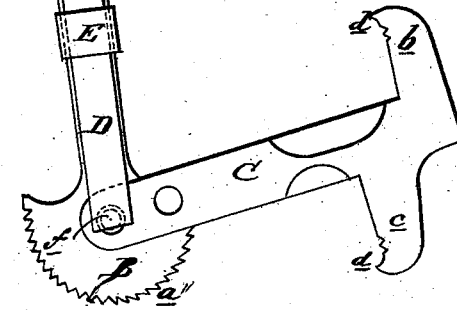
WITNESSES:
A. Schehl
C. Sedgwick
INVENTOR:
P. D. Graham
BY Munn & Co
ATTORNEYS.

UNITED STATES PATENT OFFICE.

PETER D. GRAHAM, OF BLACK HAWK, COLORADO.

COMBINED CUTTING AND CLINCHING TOOL.

SPECIFICATION forming part of Letters Patent No. 227,243, dated May 4, 1880.

Application filed November 24, 1879.

*To all whom it may concern:*

Be it known that I, PETER D. GRAHAM, of Black Hawk, in the county of Gilpin and State of Colorado, have invented a new and Improved Combined Cutting and Clinching Tool, of which the following is a specification.

Figure 1 is a side elevation of the clincher part of the tool, showing the manner in which the cutting part is attached. Fig. 2 is a side elevation of the cutter portion of the tool, showing how it may be attached to the clincher part. Fig. 3 is an end view of the clincher part of the tool.

Similar letters of reference indicate corresponding parts.

The object of this invention is to provide a new, useful, and convenient tool for cutting and clinching horseshoe-nails.

In the drawings, A represents the handle or lever, having a head, B, provided with teeth or serrations $a$. C is the dog, whose claws $b\,c$ are provided with teeth $d$, the outer tooth in each claw $b\,c$ being curved and sharp, as shown.

The legs of the dog C straddle the lever-head B, and are pivoted thereon by the pin $f$, that projects from the end of the spring D, which spring D is held in position against the side of the lever or handle A by the movable band or clamp E.

Lower down on the lever or handle A are the bands F, that form sockets for the angular insertion of one leg, $g$, of the cutter or pinchers G, and at their points of contact the lever A and the leg $g$ of the cutter G are provided with corresponding grooves $h$, so that when they are fitted together a pin may be introduced into the said grooves $h$ to hold the two parts of this combined tool together.

Other devices for uniting the two tools may be adopted without departing from my invention; but this device is simple and sufficient.

The cutter or pinchers G resemble those in common use by horseshoers, and consist of two legs, $g\,i$, pivoted together at $k$, and having curved and sharp cutting-jaws $m$, the leg $g$ being beveled at the end, as shown, that it may be united to the clincher portion of the combined tool at a proper and convenient angle.

After a nail is driven home in fitting on a shoe the claw $b$ or $c$ of the dog C is adjusted so that its outer curved tooth shall engage under the head of the said nail, while the serrated edge of the head B of the lever rests against or upon the point of the nail on the upper surface of the hoof. Then the free end of the said lever A is worked upward and inward to press down and clinch the nail. The teeth $d$ and the serrations $a$ respectively keep the parts from slipping from the nail.

For clinching long nails the claw $b$ would be used, and the dog C itself be pivoted at its lowest hole, as shown in Fig. 1; and by adjusting the position of the said dog C on the head B, and by using the claw $c$, the shortest nails can be successfully clinched.

By turning the tool in the hand the cutter portion G may be brought into use for the work to which it is adapted.

In this combined tool the legs or handles may safely be made lighter than if the two parts of the tool were intended to be used separately; hence this combined tool is economical in construction, and in using this tool much time is saved by avoiding the frequent laying down and picking up the separate tools in the operation of horseshoeing.

A rasp, also, may be combined with this tool by fitting the rasp-handle upon a leg of the cutter or pinchers.

Having thus described my invention, I claim as new and desire to secure by Letters Patent—

1. The within-described horse-nail-clincher tool, consisting of the handle A, serrated crescent head B, and pivoted dog C, constructed and arranged substantially as herein shown and described.

2. The spring and pin D $f$ and clamp E, in combination with the head B and dog C, substantially as herein set forth.

PETER D. GRAHAM.

Witnesses:
L. C. SNYDER,
R. S. HAIGHT.